United States Patent Office 3,557,102
Patented Jan. 19, 1971

3,557,102
NOVEL NITROFURAN DERIVATIVE AND A PROCESS FOR THE PREPARATION THEREOF
Ryuzo Ueno, Nishinomiya-shi, and Ichiro Hirao and Yasuhiko Kato, Kitakyushu-shi, Japan, assignors to Kabushiki Kaisha Ueno Seiyaku Oyo Kenkyuio, Osaka, Japan, a corporation of Japan
No Drawing. Filed Feb. 26, 1968, Ser. No. 707,946
Claims priority, application Japan, Sept. 21, 1967, 42/60,177; Sept. 22, 1967, 42/60,479; Oct. 2, 1967, 42/63,019, 42/63,020; Oct. 20, 1967, 42/67,451
Int. Cl. C07d 85/54
U.S. Cl. 260—240.1                    11 Claims

ABSTRACT OF THE DISCLOSURE

A novel nitrofuran derivative which is 2-substituted amino - 5 - [2(5-nitro-2-furyl)-1-(2-furyl)vinyl] - 1,3,4-oxadiazole wherein the 2-substituted amino group is sulfamino, hydroxymethylamino, and mono- or di-lower alkylamino group.

It has a very potent antimicrobial activity and broad antimicrobial spectrum as well as very low toxicity, and is useful as an active component of a microorganism inhibitor.

---

This invention relates to a novel nitrofuran derivative and a process for the preparation theerof, further relating to a microorganism inhibitor which comprises said novel nitrofuran derivative as its active component.

An object of this invention is to provide a novel nitrofuran derivative having very potent antimicrobial activity and spectrum covering a wide range a swell as very low toxicity or having exceedingly low toxicity even though it shows antimicrobial activity of approximately the same degree, as compared with the known nitrofuran derivative having closely related structure.

According to the invention, a novel nitrofuran derivative represented by the general Formula I

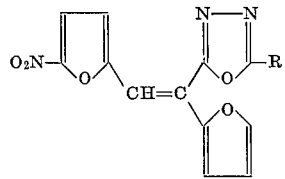

wherein R is mono sulfamino, mono hydroxymethylamino, mono stragiht chain or branched lower alkylamino, or di- straight chain or branched lower alkylamino wherein the dialkyl may be same or different, is provided.

In the definition of R in the foregoing Formula I, the lower alkyl group is preferably an alkyl group of not more than 4 carbon atoms such as methyl, ethyl, n-propyl, isopropyl, n-butyl or isobutyl.

The nitrofuran derivatives of the invention are exemplified by the following: namely, those in which the R in Formula I is either —NHCH$_3$, —NHC$_2$H$_5$, —NHC$_3$H$_7$, —NH-isoC$_4$H$_9$, —N(CH$_3$)$_2$, —N(CH$_3$)(n-C$_4$H$_9$)

—N(C$_2$H$_5$)(n-C$_4$H$_9$), —N(n-C$_4$H$_9$)(n-C$_4$H$_9$),

—NHCH$_2$OH, or —NHSO$_3$H.

As is apparent from the Formula I, in the case of the invention derivative there exist two geometrical isomers, hereinafter defined as alpha and beta form respectively, based on the double bond of the vinyl group having three heterocyclic rings, and the invention nitrofuran derivative comprehends these geometrical isomers of alpha and beta forms and their mixtures. As can be seen from Table II, below, there is observed a slight difference in the melting points between the alpha and beta forms. Further, slight differences are also noted with respect to the physical properties such as solubility, Rf value and UV and IR spectrum as in the case with the melting point. A significant difference is not noticeable in the antimicrobial activity between the alpha and beta forms. The nitrofuran derivatives of alpha and beta forms are obtained by customary procedures, and the separation of the two can be effected as by the fractional crystallization technique. On the other hand, the interchange of the alpha and beta forms can be carried out in customary manner by treating the compound with such as a weak alkali, ultraviolet rays or cysteine.

In Table I, below, are given the principal properties of the nitrofuran derivative which are preferred according to this invention.

TABLE I

| R | Geometrical isomer | Melting point (Decomposition point), ° C. | Form and color of crystals |
|---|---|---|---|
| (1) —NHCH$_3$ | α | 175–6 | Orange-yellow, prismatic. |
| (2) —NHCH$_3$ | β | 168–9 | Orange-yellow, platy. |
| (3) —NHC$_2$H$_5$ | α | 190–1 | Orange-yellow, prismatic. |
| (4) —NHC$_2$H$_5$ | β | 150–1 | Orange-yellow, platy. |
| (5) —NH(iso-C$_4$H$_9$) | α | 187 | Orange-yellow, needle-like. |
| (6) —NH(iso-C$_4$H$_9$) | β | 160.5 | Orange, prismatic. |
| (7) —N(CH$_3$)$_2$ | α | 142–4 | Orange-yellow. |
| (8) —N(CH$_3$)$_2$ | β | 131–3 | Do. |
| (9) —N(CH$_3$)(n-C$_4$H$_9$) | α | 128–9 | Orange. |
| (10) —N(CH$_3$)(n-C$_4$H$_9$) | β | 115–7 | Do. |
| (11) —NH(CH$_2$OH) | | (163–5) | Yellow, needle-like. |
| (12) —NH(SO$_3$H) | | (249) | Yellow-ocher. |

The novel nitrofuran derivative of formula are prepared, for example, by the following procedures.

(1) The nitrofuran derivative of the Formula II.

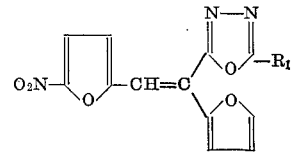

wherein $R_1$ is mono straight chain or branched lower alkylamino, or di straight chain or branched lower alkyl amino wherein the dialkyl may be same or different, are obtained by reacting in customary manner the 2-amino-5-[2 - (5 - nitro - 2 - furyl) - 1 - (2 - furyl)vinyl]-1,3,4-oxadiazole with an alkylating agent such as alkyl halide, dialkyl sulfate or alkyl arysulfonate.

The useful alkylating agents include: alkyl halide, preferably methyl iodide, ethyl bromide or iodide, propyl bromide or iodide and iso-butyl chloride or iodide; dialkyl sulfates, preferably dimethyl and diethyl sulfates; and alkyl p-toluenesulfonates, preferably methyl, ethyl, and iso-butyl p-toluenesulfonates.

The reaction is carried out by heating the reactants for 30 minutes to over ten hours, and preferably for 30 minutes to several hours, at a temperature between room temperature and 250° C., and preferably 50–200° C., in an inert solvent, e.g. alcohol, dioxane, tetrahydrofuran, dimethylformamide, keton such as acetone, diethyl keton and methyl ethyl ketone.

An acid binding agent such as alkali metal hydroxide, alkali metal carbonate, alkali metal alkoxide or organic tertiary base may be used in this reaction.

(2) The nitrofuran derivatives of Formula I can be obtained by heating and ring closure of the 2-(2-furyl)-3-(5-nitro-2-furyl)acrylic acid derivatives of Formula III

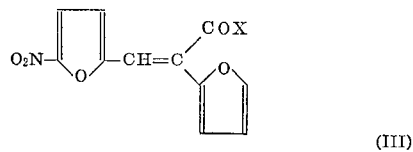

(III)

wherein X represents the groups

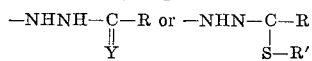

wherein Y is oxygen or sulfur, R' is lower alkyl, and R has the same meaning above defined.

This reaction is carried out by heating the starting material III, preferably in an anhydrous state, in an inert solvent, preferably in the presence of a condensing agent, for usually 30 minutes to 6 hours at 50–150° C., and preferably 50–100° C.

As the foregoing solvent can be used the organic solvents such lower alcohols as ethanol and 2-methoxy ethanol, dioxane, tetrahydrofuran, dimethylformamide, diethylformamide, dimethyl sulfoxide and propylene glycol. Preferred are either ethanol, 2-methoxy ethanol, dioxane or the mixtures of these solvents. On the other hand, as the foregoing condensing agent, useable are the inorganic phosphorus compounds such as phosphorus trichloride, phosphorus pentachloride, and phosphorus pentoxide and the oxides of metals such as lead, copper, silver and iron, which can form sulfide by reacting with hydrogen sulfide, or the tertiary organic bases such as pyridine, triethylamine and dimethylaniline, preferred being phosphorus trichloride, lead oxide and trilead tetroxide.

(3) 2-mono hydroxymethylamino - 5 - [2 - (5 - nitro-2-furyl)-1-(2-furyl)vinyl]-1,3,4-oxadiazole is obtained by reacting formaldehyde with the 2-amino-5-[2-(5-nitro-2-furyl) - 1 - (2 - furyl)vinyl]-1,3,4-oxadiazole. The formaldehyde can be used in a gaseous state or as an aqueous solution or as a polymer such as paraformaldehyde.

The reaction is carried out by heating the reactants in an inert solvent for usually 20 minutes to one hour at usually 40–150° C., and preferably 50–100° C. As the inert solvent, dioxane, dimethylformamide, diethylformamide, dimethyl sulfoxide, ethanol, water and the mixtures of these solvents may be used.

(4) 2 - sulfamino - 5 - [2 - (5 - nitro - 2 - furyl)-1-(2-furyl)vinyl]-1,3,4-oxadiazole is obtained by reacting the 2-amino - 5 - [2 - (5 - nitro-2-furyl)-1-(2-furyl) vinyl]-1,3,4-oxadiazole with a sulfonating agent in about an equimolar amount based on the starting oxadiazole compound. As the sulfonating agent, useable are the known sulfonating agents such as chlorosulfonic acid, nitrilosulfonates, alkylsulfonates, arylsulfonates, imidodisulfonates, sulfamic acid and alkylthiosulfonates.

The reaction is carried out by heating the reactants in an inert solvent for usually 30 minutes to 3 hours at usually 40–200° C., and preferably 50–150° C. When chlorosulfonic acid is used as the sulfonating agent, the reaction can be carried out in the presence of an inorganic base such as an alkali carbonate, or a tertiary organic base such as pyridine and dimethylaniline, as an acid binding agent at a relatively low temperature of from room temperature to −20° C. As the inert solvent, useable are such as methyl acetate, ethyl acetate, butyl acetate, amyl acetate, dimethylformamide, diethylformamide, dioxane and kerosene.

The minimum concentration (μg./ml.) of the novel typical nitrofuran derivatives of this invention needed for inhibiting the growth of various microoragnisms and the lethal dose for 50% of the test animals ($LD_{50}$ mg./kg.) when the novel nitrofuran derivatives were orally or intraperitoneally administered to mice as well as those of 5-nitro-2-furyl aryl amide as control are shown in the following Table II. By way of information, the minimum growth inhibiting concentration was measured as to the microorganisms cultivated at 37° C. for 48 hours in a culture medium of pH 7.2 which consists of 30 g. of commercial Tripto. Soy. Bouillon (trade name) dissolved in 1 liter of water. Tripto. Soy. Bouillon is a product of Eiken, Japan, and 30 grams thereof contain 17 g. of triptone, 3 g. of soy-peptone, 2.5 g. of glucose, 2.5 g. of dipotassium hydrogen phosphate and 5 g. of sodium chloride.

TABLE II

| R (Geometrical Isomer) | DP | Sh | Sa | Se | Bs | Sp | Ec | Kp | Pv | Pa | Ca | T | Tb | Th | $LD_{50}$ |
|---|---|---|---|---|---|---|---|---|---|---|---|---|---|---|---|
| —NH(CH₃)(α) | 0.15 | 1.5 | | 0.2 | | 6.0 | | 1.5 | 1.5 | | | | | | 1,200 |
| —NH(CH₃)(β) | 0.15 | 1.5 | | 0.2 | | 6.0 | | 1.5 | 1.5 | | | | | | 654.5 |
| —NH(C₂H₅)(α) | 0.6 | 1.5 | | 0.4 | | 6.0 | | 6.0 | 3.2 | 12.0 | 25.0 | 0.39 | 0.39 | | >12,000 |
| —NH(C₂H₅)(β) | 1.2 | 1.5 | | 0.2 | | 6.0 | | 6.0 | 3.0 | | | | | | >12,000 |
| —NH(iso-C₄H₉)(α) | 20.0 | 10.0 | 6.0 | 12.0 | 0.2 | 25.0 | 25.0 | 25.0 | 12.0 | 25.0 | 25.0 | 25.0 | 0.78 | 0.78 | >12,000 |
| —NH(iso-C₄H₉)(β) | 5.0 | 6.0 | | 0.3 | | 25.0 | 25.0 | | 25.0 | | | | | | >12,000 |
| —NH(SO₃H) | 1.56 | 1.56 | | 0.39 | | 3.13 | | 3.13 | 0.62 | | | | | | >12,000 |
| —NH(CH₂OH) | 1.2 | 0.8 | 1.5 | 0.4 | 6 | 3 | 1.5 | 6 | 3 | | | | | | >12,000 |
| Control | 10 | 6.25 | | 3.13 | | 6.25 | | 25 | 25 | | | | | | 680 |

The abbreviations used in the table are those of the following microorganisms.

DP: *Diplococcus pneumoniae* I
Sh: *Streptococcus haemolyticus* A 089
Sa: *Staphylococcus aureus* 209 P
Se: *Salmonella enteritidis* 1891
Bs: *Bacillus substilis* PCI 219
Sp: *Salmonella pullorum* Nakayu 114
Ec: *Escherichia coli* 0–55
Kp: *Klebsiela pneumoniae* St-101
Pv: *Proteus vulgaris* OX 19
Pa: *Pseudomonas aeruginosa* Iizima
Ca: *Candida albicans* FIA-1238
T: *Trichophyton rubrum* 4218
Tb: *Trichomonas vaginalis* 4F
Th: *Trichomonas foetus* f11

As is apparent from Table II, above, the novel nitrofuran derivative of this invention, as compared with the known closely related nitrofuran derivative, either have very potent antimicrobial activity and spectrum covering a wide range as well as very low toxicity or have exceedingly low toxicity even though it demonstrates antimicrobial activity of approximately the same degree.

Hence, they are useful as a microorganism inhibitors such as chemotherapeutic for human, animal and poultry; preservative for food, paper and textile product use; disinfectant of water; animal feed additive; fungicide for agricultural and horticultural use; and antiseptic for cosmetic use.

This invention provides versatile microorganism inhibitors which comprise as their active component a nitrofuran derivative of the Formula I

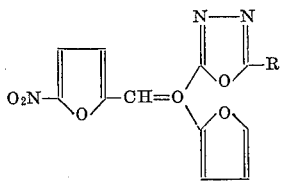

(I)

wherein R has the same meaning above defined.

The active component of the invention not only can be used alone but it can be used in combination with the various known carriers or adjuvants in customary manner in accordance with the uses to which the microorganism inhibitors are to be applied.

As a chemotherapeutic for human, animal or poultry, the active component can be administered as a powder, granular, tablet, water, suspension or injection preparation and the like, along with a pharmacologically acceptable carriers or adjuvants known for analogous chemotherapeutics.

Examples of such carriers or adjuvant are:

for tablets and dragees: lactose, starch, talcum, stearic acid;
for syrups: solutions of cane sugar, invert sugar and glucose;
for injectable solutions: water, alcohols, glycerin and vegetable oils.

The microorganism inhibitors may furthermore contain suitable preserving, stabilizing and wetting agents, solubilizers, sweetening and colouring substances and flavourings.

While the dosage at each administration will vary considerably depending upon such as the objective symptom of therapy, the class of animal, age, weight and the class of the active component, 1 to 1000 mg., and preferably 2 to 500 mg., is suitable. For example, a milk cow which produces much milk is susceptible to mastitis, which becomes a great hindrance from the standpoint of milk production. This disease is caused by bacteria developing in the udder, and especially Staphylococcus aureus or Streptococcus haemolyticus. When a microorganism inhibitor containing 200–400 mg. of the invention active component is injected into the udder of a cow which has contracted mastitis, excellent therapeutic effects are attained in the treatment of mastitis.

On the other hand, as an additive of animal feed, the active component can be continously administered to such domestic animals as chickens and hogs by adding the active component to the feeds of these animals. Alternatively, the active component can be used dissolved or suspended in the drinking water of these animals. Thus, by administering the active component to the foregoing animals the various disorders which impair the growth of these animals can be prevented, with the consequence that their normal growth and development can be achieved.

As a preservative of food, it is possible to maintain the freshness of fish for 24–72 hours by dipping fresh fish in a seawater solution containing 3–10 p.p.m. of the active component. The propagation of Escherichia coli can be inhibited by adding 3–10 p.p.m. of the active component to milk, thus prolonging the storage period of milk by 2–3 days. The addition of 2–15 p.p.m. of the active component to fish sausage makes it possible to preserve the fish sausage for a period of 2 to 5 months. Again, the preservation period of meat sausage can be prolonged by 7–10 days by adding 3–10 p.p.m. of the active component to meat sausage. The addition of 1–2 p.p.m. to boiled fish paste prolongs the preservation period thereof by about 24 hours. In the case of the foregoing sausages and boiled fish paste, still greater effects can be had by using the invention active component with either sorbic acid or the other preservatives.

The preservation period of the cosmetic vanishing cream can be further prolonged by 1–2 months by the addition of 1–10 p.p.m. of the active component, while in the case of tooth paste, not only can its decomposition and rot ascribable to microorganisms be prevented semipermanently but also the disinfection of the oral cavity becomes possible by the use of a tooth paste so incorporated with the invention active component.

In the case of the emulsion type resin paint, a storage period of 40–50 days is demonstrated by the addition of 3–6 p.p.m. of the invention active component, as compared with a storage period of about 7 days in the case of that in which the active component has not been incorporated. On the other hand, the storage period of starch paste can be prolonged by 60 days by the addition of 1–2 p.p.m., as compared with that in which the active component has not been incorporated.

Further, as an agricultural and horticultural fungicide, protective and therapeutic effects of above 90% can be obtained, for example; when the diseases of cucumber are treated by spraying the vines with an emulsion containing 80–100 p.p.m. of the invention active component, as compared with an incidence of 100% when the spraying was not carried out.

The following examples are given for the purpose of illustrating the present invention and are not intended to be in limitation of the scope thereof.

The compound numbers referred to in the following examples are those indicated in the hereinbefore given Table I.

EXAMPLE 1

2-sulfamino-5-[2-(5-nitro-2-furyl)-1-(2-furyl)vinyl]-1,3,4-oxadiazole

To a mixture of 5.8 grams of 2-amino-5-[2-(5-nitro-2-furyl)-1-(2-furyl)vinyl]-1,3,4-oxadiazole and 100 ml. of ethyl acetate is added a solution of 4.2 grams of chlorosulfonic acid in 20 ml. of ethyl acetate, following which the so obtained mixed solution is heated under reflux for 6 hours. The precipitates separating out after cooling of the mixture are filtered followed by washing with 80 ml. of methanol and recrystallized from methanol to obtain 2.9 grams of ocherous crystals. While this compound does not exhibit a clear melting point, its decomposition is observed at 249° C. when measured with a differential thermometer.

Analysis.—Calcd. $C_{12}H_8O_8N_4S$ (percent): C, 39.13; H, 2.19; N, 15.21. Found (percent): C, 38.85; H, 2.42; N, 14.93.

EXAMPLE 2

2-sulfamino-5-[2-(5-nitro-2-furyl)-1-(2-furyl)vinyl]-1,3,4-oxadiazole

A mixed solution obtained by using 2.8 grams of sulfuric anhydride instead of 4.2 grams of chlorosulfonic acid in Example 1 is heated under reflux for 3 hours. Thereafter, by operating as in Examples 1, 2.4 grams of ocherous crystals are obtained.

EXAMPLE 3

2-sulfamino-5-[2-(5-nitro-2-furyl)-1-(2-furyl)vinyl]-1,3,4-oxadiazole

A mixed solution of 2.9 grams of 2-amino-5-[2-(5-nitro-2-furyl)-1-(2-furyl)vinyl] - 1,3,4-oxadiazole, 60 ml.

of kerosene and 1.2 grams of sulfamic acid is heated for 5 hours at 150–160° C. with stirring. After cooling, the precipitates are filtered, washed with water and thereafter recrystallized from methanol to obtain one gram of a product identical to that obtained in Example 1.

EXAMPLE 4

2-sulfamino-5-[2-(5-nitro-2-furyl)-1-(2-furyl)vinyl]-1,3,4-oxadiazole

Except that either 2.8 grams of potassium imidodisulfonate or 1.9 grams of sodium ethylthiosulfate are used instead of 1.2 grams of sulfamic acid in Example 3, the reaction is otherwise carried as in said Example 3. After cooling, the reaction solution obtained is acidified with a mineral acid and thereafter treated as in Example 1 to obtain 0.9 gram of the same product.

EXAMPLE 5

2-hydroxymethylamino-5-[2-(5-nitro-2-furyl)-1-(2-furyl)vinyl]-1,3,4-oxadiazole

Ten grams of 2-amino-5 - [2 - (5-nitro-2-furyl)-1-(2-furyl)vinyl]-1,3,4-oxadiazole, 2.3 grams of 37% Formalin and 10 ml. of dimethylformamide are mixed, and the mixture is heated for 30 minutes at 90–95° C. in a water bath. After completion of the reaction, the reaction solution is poured into 300 ml. of ice water with thorough stirring. The crystalline precipitates which separate out upon standing of the reaction solution are collected by filtration, washed with cold water and recrystallized from dioxane to obtain 8.4 grams of yellow needles (decomposition point 163–5° C.).

*Analysis.*—Calcd. $C_{13}H_{10}O_6N_4$ (percent): C, 49.06; H, 3.17; N, 17.61. Found (percent): C, 49.36; H, 2.89; N, 17.72.

EXAMPLE 6

2-hydroxymethylamino-5-[2-(5-nitro-2-furyl)-1-(2-furyl)vinyl]-1,3,4-oxadiazole

When one gram of paraformaldehyde is used instead of 2.8 grams of 37% Formalin in Example 5 and the experiment is carried out otherwise as described therein, 7.9 grams of the same product are obtained.

EXAMPLE 7

2-methylamino-5-[2-(5-nitro-2-furyl)-1-(2-furyl)vinyl]-1,3,4-oxadiazole 3.2 grams of 1-[3-(5-nitro-2-furyl)-2-(2-furyl)acryloyl]-4-methyl-thiosemicarbazide and 5 grams of lead oxide are added to 150 ml. of anhydrous ethanol, and the mixture is stirred for 15 hours under reflux. After completion of the reaction, the precipitates are separated by filtration while still hot after which the precipitates are washed in hot ethanol. The so obtained wash liquid and the filtrate are combined and concentrated under reduced pressure. When the crude crystals obtained after cooling are recrystallized from 80% ethanol, 0.4 gram of orange-yellow prisms (alpha form, melting point 175–176° C.) is obtained.

When the crystals obtained by concentrating the recrystallization mother liquor are recrystallized from 80% ethanol, 0.4 gram of orange-yellow plates (beta form, melting point 168–169° C.) is obtained.

*Analysis.*—Calcd. $C_{13}H_{10}O_5N_4$ (percent): C, 51.66; H, 3.34; N, 18.54. Found (percent): Alpha form C, 51.83; H, 3.30; N, 18.71; beta form C, 51.74; H, 3.26; N, 18.69.

The elementary analysis values of crystals of alpha and beta forms agree with the calculated values of $C_{13}H_{10}O_5N_4$, and when they are melt blended, the melting point depresses to 140–150° C. in the mixed examination. Further, it is apparent from the results of such as thin-layer chromatography, ultraviolet and infrared spectra and nuclear magnetic resonance spectrum that the relationship of the alpha and beta form is that of geometrical isomers.

EXAMPLE 8

2-hydroxymethylamino-5-[2-(5-nitro-2-furyl)-1-(2-furyl)vinyl]-1,3,4-oxadiazole 3.2 grams of 1-[3-(5-nitro-2-furyl)-2-(2-furyl)acryloyl]-4-hydroxymethyl-thiosemicarbazide and 5 grams of lead oxide are added to 150 ml. of anhydrous ethanol, and the so obtained mixture is heated for 12 hours under reflux with stirring. After completion of the reaction, the precipitate is separated by filtration while still hot and washed with hot ethanol. The so obtained washing and the filtrate are combined and concentrated under reduced pressure. When the crude crystal obtained after cooling the solution are recrystallized from dioxane, 0.2 gram of yellow needles (decomposition point 163–165° C.) is obtained.

*Analysis.*—Calcd. $C_{13}H_{10}O_6N_4$ (percent): C, 49.06; H, 3.17; N, 17.61. Found (percent): C, 49.21; H, 3.34; N, 17.53.

EXAMPLE 9

2-dimethylamino-5-[2-(5-nitro-2-furyl)-1-(2-furyl)vinyl]-1,3,4-oxadiazole 3.4 grams of 1-[3-(5-nitro-2-furyl)-2-(2-furyl)acryloyl]-4-dimethyl-thiosemicarbazide and 5 grams of lead oxide are added to 150 ml. of anhydrous ethanol, and the so obtained mixture is heated for 20 hours under reflux with stirring. After completion of the reaction, the precipitates are separated by filtration while still hot, are washed with hot ethanol. The so obtained washings and the filtrate are combined and concentrated under reduced pressure. When the crude crystals obtained after cooling the solution are recrystallized from 70% methanol, 0.5 gram of orange-yellow crystals (alpha form, melting point 142–144° C.) is obtained.

When the crystals obtained by concentrating the recrystallization mother liquor are recrystalized from 70% methanol, 0.4 gram of orange-yellow crystals (beta form, melting point 131–133° C.) is obtained.

*Analysis.*—Calcd. $C_{14}H_{12}O_5N_4$ (percent): C, 53.16; H, 3.82; N, 17.72. Found (percent): alpha form C, 53.02; H, 3.96; N, 17.58; beta form C, 53.29; H, 3.76; N, 17.61.

As results of tests conducted as in Example 9, it was shown that the relationship of the alpha and beta forms was that of geometrical isomers.

In like manner, 0.5 gram of orange-yellow prisms (alpha form, melting point 190–191° C.) and 0.3 gram of orange-yellow plate crystals (beta form, melting point 150–151° C.) are obtained as 2-ethylamino-5-[2-(5-nitro-2-furyl)-1-(2 - furyl)vinyl]-1,3,4 - oxadiazole from 3.4 grams of 1 - [3-(5-nitro-2-furyl)-2-(2-furyl)acryloyl]-4-ethyl-thiosemicarbazide.

*Analysis.*—Calcd. $C_{14}H_{12}O_5N_4$ (percent): C, 53.16; H, 3.82; N, 17.72. Found (percent): alpha form C, 53.29; H, 3.85; N, 17.54; beta form C, 53.41; H, 3.90; N, 17.90.

2 - (n - butyl - methylamino) - 5 - [2-(5-nitro - 2-furyl) - 1 - (2 - furyl)vinyl] - 1,3,4 - oxadiazole is obtained as orange crystals (0.3 gram of alpha form, melting point 128–129° C.; 0.2 g. of beta form, melting point 115–117° C.) from 3.6 grams of 1-[3-(5-nitro-2-furyl)-2-(2-furyl)acryloyl] - 4 - n - butyl-methylaminothiosemicarbazide.

*Analysis.*—Calcd. $C_{17}H_{18}O_5N_4$ (percent): C, 56.98; H, 5.06; N, 15.64. Found (percent): alpha form C, 57.16; H, 5.12; N, 15.48; beta form C, 56.87; H, 5.21; N, 15.59.

EXAMPLE 10

2-methylamino-5-[2-(5-nitro-2-furyl)-1-(2-furyl)vinyl]-1,3,4-oxadiazole

Four grams of s-methyl-1-[3-(5-nitro-2-furyl)-2-(2-furyl)acryloyl]-4-methylisothiosemicarbazide are added to 40 ml. of 2-methoxyethanol, and the so obtained mixture is heated under reflux for one hour. After cooling of the reaction solution, 100 ml. of water are added thereto, following which the solution is allowed to stand still overnight. The crystals separated out are collected by filtration and washed with water. 3.1 grams of crude crystals having a melting point of 129–135° C. are obtained. When these crystals are recrystallized from 80% ethanol, 1.3 grams of orange-yellow prisms (alpha form, melting point 175–176° C.) separate out.

When the crystals obtained by concentrating the recrystallization mother liquor are recrystallized from 80% ethanol, 1.1 grams of orange-yellow plates (beta form, melting point 168–169° C.) are obtained.

Analysis.—Calcd. $C_{13}H_{10}O_5N_4$ (percent): C, 51.66; H, 3.34; N, 18.54. Found (percent): alpha form C, 51.82; H, 3.28; N, 18.24; beta form C, 51.94; H, 3.26; N, 18.66.

It was shown by tests conducted as in Example 7 that the relationship of the alpha and beta forms was that of geometrical isomers.

EXAMPLE 11

2-sulfamino-5-[2-(5-nitro-2-furyl)-1-(2-furyl)vinyl] 1,3,4-oxadiazole 4.7 grams of s-methyl-1-[3-(5-nitro-2-furyl)-2-(2-furyl)acryloyl]-4-sulfo-isothiosemicarbazide are added to 40 ml. of 2-methoxyethanol, and the resulting mixture is heated under reflux for one hour. After the reaction solution has cooled, 100 ml. of water are added thereto, and the solution is allowed to stand overnight. The crystals separating out are collected by filtration and washed with water. When these crystals are recrystallized from methanol, 1.2 grams of ocherous crystals (decomposition point 249° C.) are obtained.

Analysis.—Calcd. $C_{12}H_8O_8N_4S$ (percent): C, 39.13; H, 2.19; N, 15.21. Found (percent): C, 39.15; H, 2.42; N, 14.99.

EXAMPLE 12

2-dimethylamino-5-[2-(5-nitro-2-furyl)-1-(2-furyl) vinyl]-1,3,4-oxadiazole 4.1 grams of s-methyl - 1 - [3-(5-nitro-2-furyl)-2-(2-furyl)acryloyl] - 4 - dimethyl - isothiosemicarbazide are added to 40 ml. of 2-methoxy ethanol, and the resulting mixture is heated under reflux for one hour. After the reaction solution is cooled, 100 ml. of water are added thereto, following which the solution is allowed to stand overnight. The crystals separated out are collected by filtration and washed with water. The yield of crude product is 3 grams. When this is recrystallized from 70% methanol, 1.2 grams of orange-yellow crystals (alpha form, melting point 142–144° C.) is obtained.

When the crystals obtained by concentrating the recrystallization mother liquor are recrystallized from 70% methanol, 0.9 gram of orange-yellow crystals (beta form, melting point 131–133° C.) is obtained.

Analysis.—Calcd. $C_{14}H_{12}O_5N_4$ (percent): C, 53.16; H, 3.82; N, 17.72. Found (percent): alpha form C, 53.23; H, 3.71; N, 17.63; beta form C, 53.09; H, 3.88; N, 17.52.

It was shown by testing as in Example 7 that the relationship of the alpha and beta forms was that of geometrical isomers.

In like manner, 1.1 grams of orange-yellow prisms (alpha form, melting point 190–191° C.) and 0.7 gram of orange-yellow plates (beta form, melting point 150–151° C.) are obtained as 2-ethylamino-5-[2-(5-nitro-2-furyl)-1-(2-furyl)vinyl]-1,3,4-oxadiazole from 3.7 grams of s-methyl - 1-[3-(5-nitro-2-furyl)-2-(2-furyl)acryloyl]-4-ethyl-isothiosemicarbazide.

Analysis.—Calcd. $C_{14}H_{12}O_5N_4$ (percent): C, 53.16; H, 3.82; N, 17.72. Found (percent): alpha form C, 53.12; H, 3.92; N, 17.71; beta form C, 53.04; H, 3.93; N, 17.58.

Similarly, 0.9 gram of orange-yellow needles (alpha form, melting point 186.5–187° C.) and 0.7 gram of orange-yellow prisms (beta form, melting point 159.5–160.5° C.) are obtained as 2-isobutylamino-5-[2-(5-nitro-2-furyl)-1-(2-furyl)vinyl]1,3,4-oxadiazole from 4 grams of s-methyl-1-[3-(5-nitro-2-furyl)-2-(2-furyl)acryloyl]-4-isobutyl-isothiosemicarbazide.

Analysis.—Calcd. $C_{16}H_{16}O_5N_4$ (percent): C, 55.81; H, 4.68; N, 16.27. Found (percent): alpha form C, 56.15; H, 4.46; N, 16.03; beta form C, 55.94; H, 4.70; N, 16.20.

EXAMPLE 13

Fish sausages are prepared in the following manner. To minced fish flesh of 40% whale, 30% tuna, 20% croaker and 10% Alaska pollack, which are divided into several lots, are added respectively 10% of starch and 10 p.p.m., based on the total quantity of each lot, of the components 1, 2, 3 and and 5, dissolved in a small amount of propylene glycol. After thorough mixing of the starch and the foregoing compound in each lot of the minced fish flesh, the mixtures are filled in vinylidene chloride casings, which are then cooked for 40 minutes in 85–95° C. hot water to complete the preparation of the fish sausages. Each lot containing 20 pieces of the products are stored in a constant temperature apparatus of 37° C. The results of observation of the decay in the product with the naked eye are shown in Table III. The numerator in the values given in the table represents the number of those which are spoiled, while the denominator represents the total number inspected in the lot.

TABLE III

| | Storage period | | | |
|---|---|---|---|---|
| | 10 days | 20 days | 30 days | 40 days |
| Lot (Compound added): | | | | |
| 1 | 0/20 | 0/20 | 1/20 | 1/20 |
| 2 | 0/20 | 0/20 | 1/20 | 1/20 |
| 3 | 0/20 | 0/20 | 1/20 | 1/20 |
| 5 | 0/20 | 1/20 | 2/20 | 3/20 |
| Control | 20/20 | | | |

EXAMPLE 14

Boiled fish pastes are prepared in the following manner. To minced fish flesh for boiled fish paste consisting of 30% conger, 30% yellow croaker, 20% isinglass and 20% white croaker, which are divided into several lots, are added respectively 30 grams of starch and 2.5 p.p.m. of the compounds 1, 2, 4 and 11 dissolved in a small quantity of equal amounts of propylene glycol and alcohol. After further addition of 8 grams of common salt, the ingredients are mixed and thereafter the resulting mixture is formed on boards and cooked for 30 minutes, thus completing the preparation of the boiled fish paste product. This product is stored in a 30° C. constant temperature apparatus. The appearance of slime and mold on the product are inspected with the naked eye, with the results shown in Table IV. The symbols used in the table have the following meanings: − indicated no change, ± indicates that appearance is suspected but cannot be confirmed, and ++ indicates that appearance is evident at a glance.

TABLE IV

| | Slime or mold | Storage period | | |
|---|---|---|---|---|
| | | 1 day | 2 days | 3 days |
| Lot by Compound No.: | | | | |
| 1 | Slime | − | ± | ± |
| | Mold | − | − | − |
| 2 | Slime | − | ± | ± |
| | Mold | − | − | − |
| 4 | Slime | − | ± | ± |
| | Mold | − | − | − |
| 11 | Slime | − | − | ± |
| | Mold | − | − | − |
| Not added | Slime | + | ++ | ++ |
| | Mold | − | − | + |

EXAMPLE 15

Meat sausages are prepared in the following manner. To material flesh for meat sausage obtained by mincing meat from which fatty and ligamentary tissues have been removed are added a curing agent and either compound 2 or 3 in a concentration of 10 p.p.m. dispersed in a one hundredfold quantity of lactose. After mixing the components, the mixture is filled in casings and cured for 72 hours at 4° C. The encased meat is then heated for one hour at 75° C. followed by cooling under running water for 30 minutes and in ice water for another 30 minutes. When the so prepared sausages are stored for 4 weeks at 20° C., a putrescent odor became noticeable in the case of the control lot. However, in the case of the lot to which the invention compound was added, practically no increase in the bacteria count occurred.

EXAMPLE 16

Fresh horse mackerel of an average length of about 17 cm. and an average weight of about 75 grams are dorsally eviscerated. Compounds 2 and 12 are each dissolved in a small amount of an equal mixture of propylene glycol and alcohol, after which each is made into Baumé 10 degree brines of a concentration of 10 p.p.m. of the respective compounds. The horse mackerel treated as hereinabove described are immersed for 20 hours in these brines, following which they are sun-dried until the surface moisture is dry. The so treated horse mackerel are then placed in polyethylene bags and stored in a 5° C. refrigerator. The relationship between the number of days and the change in pH and the relationshp between the number of days and the change in the volatile basic nitrogen (VBN) are shown in Table V. Results of an organoleptic test are presented in Table VI. The numerical ratings in the table have the following meanings: 3 indicates satisfactory (freshness); 2, average (eating raw permissible); 1, below average (eating cooked permissible); and 0, unsatisfactory (not suitable for eating).

TABLE V

| Lot (compound added) | Storage period | | | | |
|---|---|---|---|---|---|
| | 0 days | 4 days | 6 days | 9 days | 15 days |
| Not added | 6.33 | 6.55 | 6.83 | 6.86 | 7.30 |
| pH, 2 | 6.33 | 6.33 | 6.50 | 6.72 | 6.83 |
| pH, 12 | 6.33 | 6.32 | 6.34 | 6.46 | 6.53 |
| Not added | 14.90 | 26.15 | 28.13 | 42.14 | 75.11 |
| VBN, 2 (mg. percent) | 14.90 | 16.21 | 18.13 | 22.78 | 43.45 |
| VBN, 12 (mg. percent) | 14.90 | 16.20 | 16.78 | 16.91 | 22.08 |

TABLE VI

| Storage printed, days | Lot (compound added) | Pleasing or foul odor | Appearance of eye | Appearance of slime | Skin tone | Elasticity | Averag value |
|---|---|---|---|---|---|---|---|
| 4 | (¹) | 3 | 2 | 3 | 3 | 3 | 2.8 |
| | 2 | 3 | 3 | 3 | 3 | 3 | 3 |
| | 12 | 3 | 3 | 3 | 3 | 3 | 3 |
| 6 | (¹) | 3 | 2 | 2.5 | 2.5 | 2 | 2.4 |
| | 2 | 3 | 2 | 3 | 3 | 3 | 2.8 |
| | 12 | 3 | 2.5 | 3 | 3 | 3 | 2.9 |
| 9 | (¹) | 0 | 1 | 0 | 1 | 1 | 0.6 |
| | 2 | 1 | 2 | 0 | 1 | 2 | 1.2 |
| | 12 | 2 | 2 | 2 | 2 | 2 | 2 |
| 15 | (¹) | 0 | 0 | 0 | 0 | 1 | 0.2 |
| | 2 | 0 | 0 | 0 | 0 | 1 | 0.2 |
| | 12 | 1 | 1 | 1 | 1 | 1 | |

¹ Not added.

EXAMPLE 17

Small mackerel (about 10 cm. long) immediately after being killed were immersed for 30 minutes in seawater containing 2.5 p.p.m. of respectively compounds 4 and 12 adjusted to a pH 6.65 with acetic acid. After draining the water from the immersed small mackerel for 30 seconds, they were sealed in polyethylene bags and stored at 5° C. The volatile basic nitrogen content of the small mackerel was determined by means of Conway's diffusion analysis at the passage of the prescribed storage periods, with the results shown in Table VII. The numerical values in the table represent the content in mg. per 100 grams of nitrogen in the form of ammonia, whose original value was 14.59.

TABLE VII

| | 5 | 7 | 8 | 10 | 12 |
|---|---|---|---|---|---|
| Lot (compound added): | | | | | |
| Not added | 17.49 | 20.76 | 21.03 | 38.10 | 85.35 |
| 4 | 15.63 | 15.62 | 14.70 | 18.56 | 47.58 |
| 12 | 15.47 | 15.75 | 14.05 | 22.09 | 51.05 |

EXAMPLE 18

Milk cows producing milk in great quantity have a high rate of susceptibility to mastitis which becomes great hindrance from the standpoint of milk production. The cause of this malady is intimately related to the increase in the count of bacteria, especially *Staphylococcus aureus* and *Streptococcus haemolyticus*, in the udder. In the cure of this malady, in most cases the antibacterial agent is used. When the invention medicine is injected into the udder of a milk cow affected with mastitis, it was found that outstanding therapeutic effects as shown in the following Table VIII were achieved. The effective dosage per udder of the compound 12 is shown in the table.

TABLE VIII

| Compound: | Effective dosage per udder (mg.) |
|---|---|
| 12 | 400 |

EXAMPLE 19

When the compound of the invention was continuously administered by addition to feedstuffs of fowl and swine or by dissolving in the drinking water of these animals, it was found that the various maladies which impeded the growth and development of these animals are prevented and the normal development of these animals take place. Dosages of the invention compound which are effective in the case of fowl and swine are presented in Table IX. The figures in the table represent the percentages on the basis of the total quantity of the feedstuffs or drinking water.

TABLE IX

| | Fowl | | Swine | |
|---|---|---|---|---|
| | Addition to feedstuffs | Addition to drinking water | Addition to feedstuffs | Addition to drinking water |
| Compound (R): | | | | |
| 1 | 0.001–0.01 | 0.005–0.01 | 0.01–0.05 | 0.02–0.1 |

EXAMPLE 20

Rice plants were thickly sown and grown in a dry bed. The bed in which the *Cochliobolus miyabeanus* attacked seedlings grown to about the stage where three main leaves had appeared were growing was divided into plots each 0.42 square meter in size. Each of the plots was applied the compound 11 to be tested, as a wettable powder, at the rate of 100 liters per 10 are, once at the initial stage of the attack and thereafter on three occasions at intervals of 4–5 days depending upon the condition of the disease. The results judged by means of the incidence index one week after the final application are shown in Table X.

TABLE X

| Compound and drug | Amount added, p.p.m. | Incidence index per leaf |
|---|---|---|
| Untreated | | 8.3 |
| 11 | 400 | 2.5 |
| Phenyl mercuric acetate | [1] 20 | 3.9 |

[1] As Hg.

EXAMPLE 21

In a mixed aqueous solution of either compound 1 or 11 and as a deodorant chlorophyllin and a smaller quantity of perfume, tissue papers were dipped and impregnated with about 0.1% of the compound 1 or 11. The bactericidal effect, as compared with the instances of the addition of other chemicals, are shown in Table XI. The test was conducted by the plane culture technique. Agar-agar was coated with pathogenic bacteria and four sheets of the 2 x 2 cm. tissue paper were superposed and contacted with the pathogenic bacteria coated agar-agar, and the zone of the sheets showing inhibition the bacteria was observed.

TABLE XI

| Amount of compound and chemicals added, p.p.m. | Hours of action | Staphylococcus aureus | | Salmonella typhi | | Escherichia coli | |
|---|---|---|---|---|---|---|---|
| | | Plane culture | Bouillon culture | Plane culture | Bouillon culture | Plane culture | Bouillon culture |
| Cationic surfactant, 5,000 | 24 | − | − | − | + | − | + |
| Amphoteric surfactant, 5,000 | 24 | − | − | + | + | + | − |
| Hexachlorophene, 5,000 | 24 | − | − | + | + | + | − |
| 1, 1,000 | 24 | − | − | − | − | − | − |
| 11, 1,000 | 24 | − | − | − | − | − | − |

Then the agar-agar culture is contact with the tissue paper, as hereinbefore described, was taken and observations were made after further carrying out the bouillon cultivation.

When the tissue paper which has been treated as hereinbefore described is placed on the skin the medicine gradually elutes because of its water content and demonstrated a sterilizing action. Thus, it is valuable as a beauty and hygienic product in view of its antiseptic and deodorant action. Gauze can also be used instead of tissue paper.

EXAMPLE 22

A mixture consisting of 20% of stearic acid, 30% of cetyl alcohol and 30% of glycerol is rendered slightly acid by saponifying with caustic soda. To this was added in an amount of 10% based on the total quality a solution consisting of a 1:1 water-propylene glycol mixture in which had been dissolved compound 11 such that its content therein would become 40 γ/ml. The so obtained mixture was stirred thoroughly along with 10 parts of sorbitan monostearate to effect its emulsification. When the so obtained vanishing cream was stored at 30° C., there was observed no contamination at all by means of microorganisms for a period of 3 months.

What is claimed is:
1. A nitrofuran derivative having the general formula

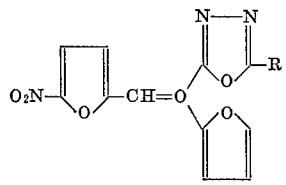

(I)

wherein R is mono sulfamino, mono hydroxymethyl- amino, mono straight chain or branched lower alkylamino or di straight chain or branched lower alkylamino wherein the dialkyl may be same or different.

2. 2 - methylamino - 5 - [2 - (5-nitro-2-furyl)-1-(2-furyl)vinyl]-1,3,4-oxadizole.

3. 2 - ethylamino - 5 - [2 - (5 - nitro-2-furyl)-1-(2-furyl)vinyl]-1,3,4-oxadizole.

4. 2 - iso - butylamino - 5 - [2 - (5-nitro-2-furyl)-1-(2-furyl)vinyl]-1,3,4-oxadizole.

5. 2 - dimethylamino - 5 - [2 - (5-nitro-2-furyl)-1-(2-furyl)vinyl]-1,3,4-oxadiazole.

6. 2 - di - n - butylamino-5-[2-(5-nitro-2-furyl)-1-(2-furyl)vinyl]-1,3,4-oxadiazole.

7. 2 - (methyl - n - butyl)amino - 5 - [2-(5-nitro-2-furyl)-1-(2-furyl)vinyl]-1,3,4-oxadiazole.

8. 2 - hydroxymethylamino - 5 - [2-(5-nitro-2-furyl)-1-(2-furyl)vinyl]-1,3,4-oxadiazole.

9. 2 - sulfamino - 5 - [2 - (5-nitro-2-furyl)-1-(2-furyl)vinyl]-1,3,4-oxadiazole.

10. The nitrofuran derivative of claim 1 in which it is the α-form geometrical isomer.

11. The nitrofuran derivative of claim 1 in which it is the β-form geometrical isomer.

References Cited

UNITED STATES PATENTS 3,260,716   6/1966   Takai et al. _____ 260—240
3,303,188   2/1967   Takai et al. _____ 260—240
3,337,541   8/1967   Haraoka et al. _____ 260—240

OTHER REFERENCES

Burger: Medicinal Chemistry, vol. 1, p. 46 (1951).
Gilman: Organic Chemistry, vol. III, 2nd ed. 8th printing, pp. 444–447, John Wiley and Sons (1953).
Weissberger: Technique of Organic Chemistry, vol. III, 2nd ed., pp. 488–489, Interscience Publishers, Inc. New York (1956).
Hirao: Nippon Kagaku Zasshi, vol. 88, pp. 574–575 (May 1967).
Index Chemicus, vol. 19, No. 6, issue 136, 58974 December 1965).
Houben-Weyl: Methoden fur Organischen Chemie, 4th ed., Band 11/2, pp. 644, 659–663 and 665, Georg Thieme Verlag, Stuttgart, Germany (1958).
Saikawa et al.: Yakugaku Zasshi, vol. 84, pp. 219–224 (1964).

JOHN D. RANDOLPH, Primary Examiner

U.S. Cl. X.R.

99—2, 4, 157, 158, 160; 162—161; 252—380; 260—45.8, 240; 424—49, 272, 365

UNITED STATES PATENT OFFICE
CERTIFICATE OF CORRECTION

Patent No. 3,557,102                  Dated  January 19, 1971

Inventor(s)  RYUZO UENO ET AL

It is certified that error appears in the above-identified patent and that said Letters Patent are hereby corrected as shown below:

Claim 1, formula, change "CH = O" to "CH = C"

Signed and sealed this 30th day of March 1971.

(SEAL)
Attest:

EDWARD M. FLETCHER, JR.                WILLIAM E. SCHUYLER, JR.
Attesting Officer                      Commissioner of Patents